United States Patent [19]
Larson

[11] Patent Number: 6,061,073
[45] Date of Patent: May 9, 2000

[54] TRACKING OF GRAPHICS POLYGON DATA FROM DIFFERENT CLOCK DOMAINS IN A GRAPHICS PROCESSOR

[75] Inventor: Michael K. Larson, Kirkland, Wash.

[73] Assignee: Cirrus Logic, Inc., Fremont, Calif.

[21] Appl. No.: 08/968,950

[22] Filed: Nov. 12, 1997

[51] Int. Cl.[7] .................................................. G06T 1/00
[52] U.S. Cl. ......................... 345/501; 345/522; 713/400
[58] Field of Search .................................... 345/501, 522, 345/213, 513; 395/551; 713/400

[56] References Cited

U.S. PATENT DOCUMENTS

5,581,280  12/1996  Reinert et al. ............................ 345/200
5,793,386   8/1998  Larson et al. ............................ 345/522

Primary Examiner—Kee M. Tung
Attorney, Agent, or Firm—Jonathan M. Harris; Steven A. Shaw

[57] ABSTRACT

A graphics system includes a graphics processor for rendering graphics primitives with a list of display parameters. A host processor generates from a first clock domain a display list which includes poly parameter data for rendering the graphics primitives. A graphics processor which includes internal fetch and store unit stores and processes the polygon parameter data in a second clock domain different from the first clock domain. To ensure the complete processing of polygon data from the first clock domain in the second clock domain, the graphics processor includes a polygon data tracking logic for tracking the flow of the polygon data in the graphics processor. The polygon data tracking logic includes an up/down counter which up counts polygon data fetched in the graphics processor and down counts the polygon data when the polygon data is processed in the graphics processor.

35 Claims, 6 Drawing Sheets

TRACKING OF GRAPHICS POLYGON DATA FROM DIFFERENT CLOCK DOMAINS IN A GRAPHICS PROCESSOR

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention relates generally to improvements in a graphics processor for computers. More particularly, the present invention relates to a graphics processor having an internal data tracking unit for tracking data flow in the graphics processor and synchronizing the data status to the graphics processor's internal clock domain.

DESCRIPTION OF THE RELATED ART

Sophisticated graphics packages have been used for some time in expensive computer design and graphics systems. Increased capabilities of graphics controllers and display systems, combined with standardized graphics languages, have made complex graphics functions available in even the most routine applications. For example, word processor, spread sheets and desktop publishing packages now include relatively sophisticated graphics capabilities. Three-dimensional (3D) displays have become common in games, animation, and multimedia communication and drawing packages.

The availability of sophisticated graphics in PCs has driven a demand for even greater graphics capabilities. To obtain these capabilities, graphics systems must be capable of performing more sophisticated functions in less time to process greater amounts of graphical data required by modern software applications. In particular, there is a continuing need for improvements in software algorithms and hardware implementations to draw three-dimensional objects using full color, texture mapping and transparency blending.

Improvements have been made in the hardware realm. Graphics processors and accelerators are available with software drivers that interface with a host central processing unit to the graphics processor. In general, the graphics software receives information for drawing objects on a computer screen, calculates certain basic parameters associated with the objects and provides this to the graphics processor in the form of a "display list" of parameters.

A graphics controller then uses the display list values in generating the graphics objects to be displayed. A graphics processor may use interpolation techniques where the fundamental information for the object to be drawn comprises a series of initial and incremental parameters or values. The graphics processor loads or otherwise receives the initial parameters for the pixels to be drawn, interpolate the object by incrementing the parameters until the object is completely drawn.

Existing graphics implementation that use display lists typically load data in a sequential format to a register file in the graphics processor. For each type of primitive, a particular set of data value is required to render that type of primitive. For example, a point to be drawn to a pixel grid may require an x, y location, color value, and a z value for depth comparison. Conversely, if the primitive is a line, the parameters required may also include a slope to describe the line's direction in the x direction, and a count value to define the length in the y direction.

An example of a display list is shown below in Table I:

TABLE I

| ADDRESS | NAME | DESCRIPTION |
| --- | --- | --- |
| 0X4000 | X | Initial X value |
| 0X4004 | Y | Initial Y value |
| 0X4008 | R | Initial Red value |
| 0X400C | G | Initial Green value |
| 0X4014 | B | Initial Blue value |
| 0X4044 | Z | Initial depth value |

The display list provides the parameters required to draw points, lines, and polygons. The display list provided from the central processor or from memory provides data for the various registers in the register file. Not all of these values, however, are sometimes necessary to draw points of lines. A display list including a subset of the values of Table I generally is used for drawing lines, points, and polygons.

Furthermore, not all the values available to define a primitive type are necessarily used to render a particular primitive. In prior art systems, if a primitive to be rendered does not require a particular parameter, then the register is skipped on a subsequent write operation by the graphics processor without any primitive value being loaded into the corresponding register in the register file. The step of providing skipping registers in the register file values for a primitive being rendered increases the amount of memory required to store the parameters. Such register skipping also increases the amount of time required to load register files in the graphics processor and the volume of transactions on the system bus and the internal graphics processor bus during each stage of the rendering process.

Figure 1:
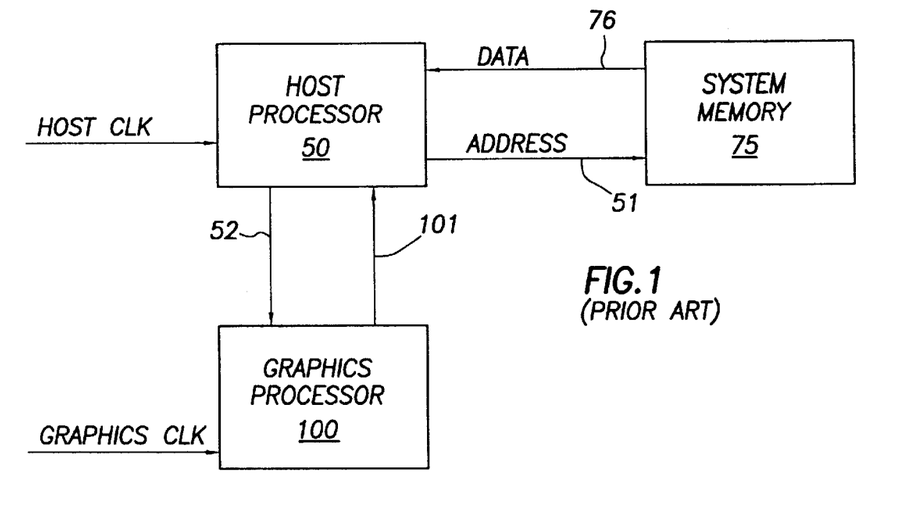
FIG. 1 is a simplified block diagram of a prior art computer system.

FIG. 1 is a simplified block diagram of a prior art computer system showing a host processor 50 coupled to a system memory 75 and a graphics processor 100. In the system shown in FIG. 1, the host processor fetches display list instructions from the system memory 75 by asserting the request line 51. The display list is provided to the host processor 50 via a system bus when the system bus when the system memory 75 asserts the signal line 76.

To process graphics primitives, the graphics processor 100 requests display list instructions from the host processor 50 by asserting the signal line 101. The requested display list instructions is provided to the graphics processor 100 at the host processor's clock within the host processor's clock domain. The display list will typically include instructions requesting the graphics processor to load certain registers in the register file after the initial primitive parameter values have been loaded into the register file. If during the rendering of the primitive, new incremental address values are required to complete the rendering of the primitive, the graphics processor 100 has to be able to fetch the required incremental data in time to complete rendering the primitive. This is because the graphics processor 100 renders primitives at its internal clock speed which is in a different clock domain than the host processor 50. Due to the difference in clock domains, the graphics processor may, in certain applications, not be able to fetch the data required to complete rendering a primitive in time from when the data is fetched in the host processor's clock domain to when the data gets to the graphics processor. This is because the graphics processor has no means of tracking operations issued from the host processor.

Consequently, prior art graphics processors do experience data losses during the transfer of display list instructions corresponding to primitive parameter data from the host processor's clock domain to the internal clock domain of the graphics processor. The graphics processor 100 may also be slow in processing primitive data since the graphics processor has to wait to get a complete set of primitive data to finish rendering a primitive.

A slow processing graphics processor affects the overall system performance of the computer system. This is as a result of the amount of graphics data that needs to be processed to handle the latest multimedia graphics applications.

It would be advantageous, therefore, if a graphics system were developed which could eliminate register clogging during a write operation of parameters during register loading and rendering of a graphics primitive.

It would further be advantageous if the host processor could simply transmit parameter values as part of the display list in a sequential group of registers which would allow the graphics processor to sequentially write to the register file regardless of whether a particular register contains data or not without incurring any extra write or clock cycles.

Thus, a system in which pixel data can be accessed from memory with a clock domain different from the destination graphics processor's clock domain without incurring an inordinate amount of memory cycles is needed.

SUMMARY OF THE INVENTION

This need and others are substantially met through the provision of a method and a system for tracking graphics operations issued from a first clock domain and processed in a second clock domain which is different from the first.

In accordance with the preferred embodiment of the present invention, polygon (poly) data storage devices internal to a graphics processor are controlled and monitored to determine when to fetch and store the poly data from an external memory source for processing in the graphics processor. The preferred embodiment includes a poly data tracking logic which tracks the prefetched poly data to ensure that the poly data queued in the graphics processor's internal storage unit is the required data for a graphics primitive being rendered in the graphics processor.

The poly tracking logic includes an address increment logic counter which is increased as the poly data is presented to the graphics processor from the external memory source. Control signals coupled to the address increment counter are asserted by the poly tracking logic to synchronize the prefetched poly data to the graphics processor's internal clock domain once the data is received in the graphics processor.

The poly tracking logic further includes an address decrement counter which decreasingly counts the poly data processed in the graphics processor. Control signals coupled to the address decrement counters are asserted by the poly tracking logic to signal the completion of the processing of prefetched poly data in the graphics processors internal clock domain.

In monitoring the in-flow and out-flow of poly data, the poly tracking logic applies stalling logic to the internal storage units to stall the prefetch of poly data into the graphics processor. Stalling poly data prefetch continues until the graphics processor has completed processing poly data already fetched and stored in the graphics processor for a graphics primitive being rendered. By stalling the prefetch of poly data, the poly tracking logic is able to ensure that the correct status of the state of the prefetched poly data in the graphics processor's clock domain is preserved.

The poly tracking logic also includes a state machine logic which controls the various processing states of the poly tracking logic. A first increment state controls and monitors poly data increments in the graphics processor. Similarly, a second decrement state monitors and controls poly data decrements in the graphics processor as graphics primitives are rendered. Additionally, a third idle state stalls the prefetch of poly data into the graphics processor while a fourth normal state of processing processes data prefetched in the graphics processor.

By operating in the four states, the poly tracking logic is able to ensure that prefetched poly data from the system memory is provided to the graphics processor at a clock state synchronized to the clock state of the system memory.

Accordingly, the present invention is able to fetch and store poly data in synchronized clock domains thereby preserving the status of the data from source to destination. This and further advantages of the present invention will become apparent upon reading the detailed description which follows.

BRIEF DESCRIPTION OF THE DRAWINGS

A better understanding of the present invention can be obtained when the following detailed description of the preferred embodiment is considered in conjunction with the following drawings in which.

DETAILED DESCRIPTION OF THE DRAWINGS

A method and apparatus for providing a means of internally storing and fetching graphics polygon data from an external memory source of a first clock domain and synchronizing and processing the fetched polygon data in a destination graphics processor in a second clock domain that is different from the first clock domain is disclosed.

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have been described in detail as not to unnecessarily obscure aspects of the present invention.

Some portions of the detailed description which follow are represented in terms of procedures, logic blocks, processing, and other symbolic representations of operations on data bits within a computer system. These descriptions and representations are the means used by those skilled in the art to most effectively convey the substance of their work to others skilled in the art. A procedure, logic block, process etc., is herein, and generally, conceived to be a self-consistent sequence of steps or instructions leading to a desired result.

The steps are those requiring physical manipulations of physical quantities. Usually, signals are capable of being stored, transferred, combined, compared, and otherwise manipulated in a computer system. For reasons of convenience, and with reference to common usage, these signals are referred to as bits, values or the like with reference to the present invention.

It should be borne in mind, however, that all of these terms are to be interpreted as referencing physical manipulations and quantities and merely convenient labels and are to be interpreted further in view of terms commonly used in the art. Unless specifically stated otherwise as apparent from the following discussions, it is understood that thorough discussions of the present invention, discussions utilizing terms such as "processing" or "computing" or "calculating" or "determining" or "displaying" or the like, refer to the actions and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

In the ensuing description, the same reference numerals are employed to refer to corresponding or like elements throughout.

Figure 2:
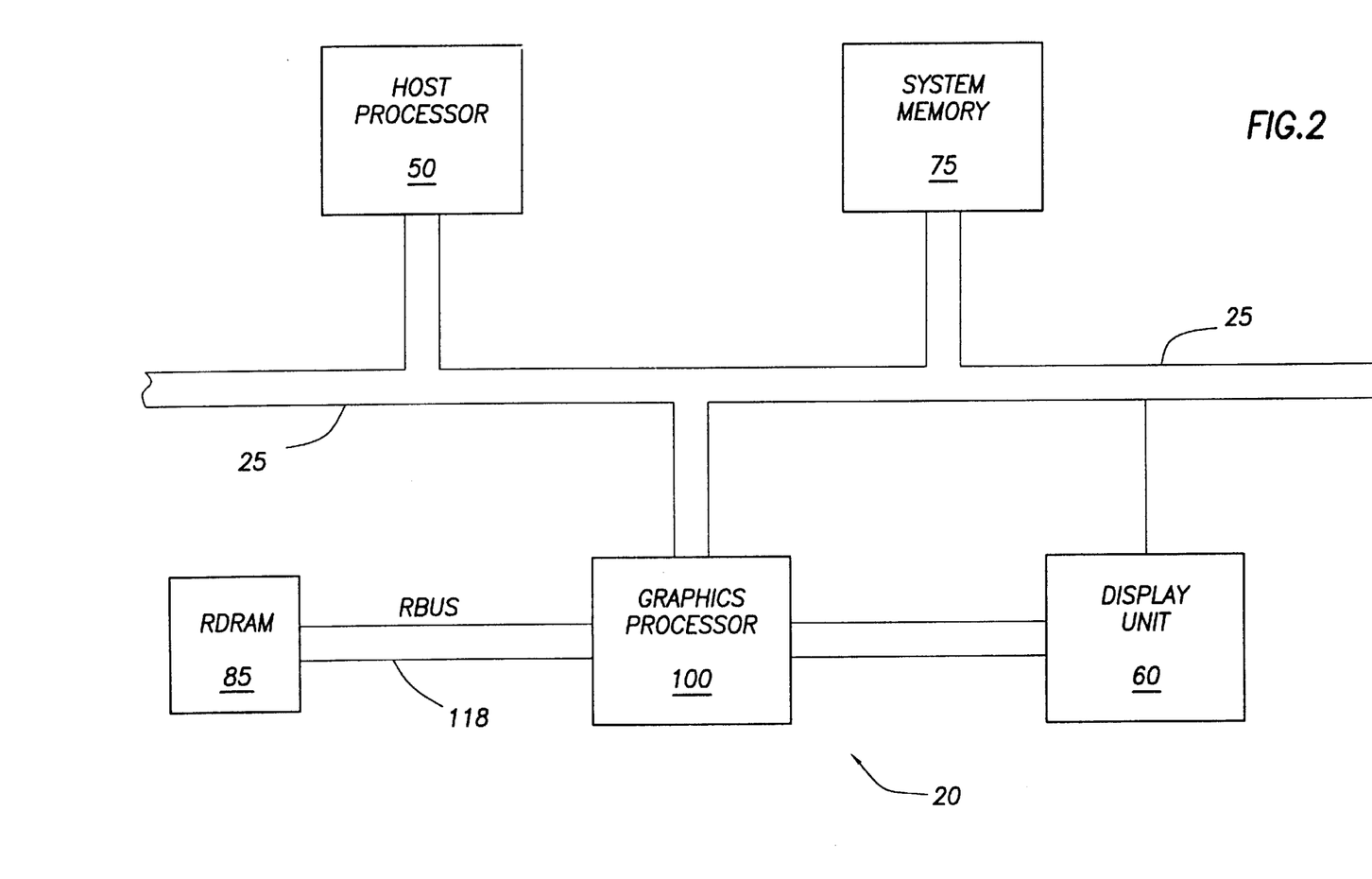
FIG. 2 is a block diagram illustrating a computer system including a graphics processor in accordance with the teachings of the present invention.

With reference to FIG. 2, a block diagram is shown of a host computer system 20 used by the preferred embodiment of the present invention. In general, host computer 20 comprises a bus 25 for communicating data and instructions, a host processor (CPU) 50 coupled to bus 25 for processing data and instructions, a computer readable memory unit 75 coupled to bus 25 for storing data and instructions from the host processor 50.

The host processor 50 provides data and control signals via bus 25 to a graphics hardware subsystem. The graphics hardware subsystem includes a graphics processor 100 which executes a series of display instructions found within a display list. The graphics processor 100 supplies data and control signals to a frame buffer 85 which refreshes the display device for rendering images on display device 60. The display device 60 utilized with the computer system 20 of the present invention can be a liquid crystal device, cathode ray tube, or other display device suitable for creating graphics images and alphanumeric characters recognizable to the computer user.

It should be understood that the particular embodiment shown in FIG. 2 is only one of many possible implementations of a graphics system for use in a computer system. The system shown in FIG. 2 is simplified for purposes of clarity so that many components and control signals are omitted which are not necessary to understand the present invention.

In the preferred embodiment, the graphics processor 100 provides hardware support for 2D and 3D graphics, and for text and windowing operations of a computer system. The graphics processor 100 transfers digital data from the system memory 75 or host processor 50, and processes data for storage in the frame buffer (RDRAM) 85 ultimately for display on the display unit 60. RDRAM 85 of the preferred embodiment is a RAMBUS type dynamic random access memory device. However, other types of memory may be use.

The host processor 50 and system memory 75 both preferably communicate with the graphics processor 100 via the system bus 25. The system bus 25 preferably is the peripheral component interconnect (PCI) bus.

Still referring to FIG. 2, the graphics processor 100 couples to the system bus 25. In accordance with the preferred embodiment, the graphics processor 100 preferably includes bus mastering capabilities, thus permitting graphics processor 100 to bus master the system bus 25. Graphics processor 100 also couples to a display unit 60 and a RDRAM 85.

In the preferred embodiment, the RDRAM 85 comprises a bank of RDRAM buffers, where the digital data stored in the RDRAM comprises a rectangular array of picture elements referred to as pixels or pixel values. Each pixel can be defined by an 8 bit value, for example, which specifies the intensity of a single color of a corresponding pixel on a screen of the display unit 60.

The display unit 60 may be any suitable type of display device, such as a cathode ray tube CRT) for desktop, workstation or server applications, a liquid crystal display (LCD) or any other suitable display device for a personal computer.

The RDRAM frame buffer 85 provides a performance improvement by permitting faster access to display list instructions and pixel data, compared to accessing data stored in the main memory 75 of the host computer system 20. The graphics processor 100 communicates to the RDRAM buffer 85 through address data and control lines, collectively referred to as a RBUS 118.

Figure 3:
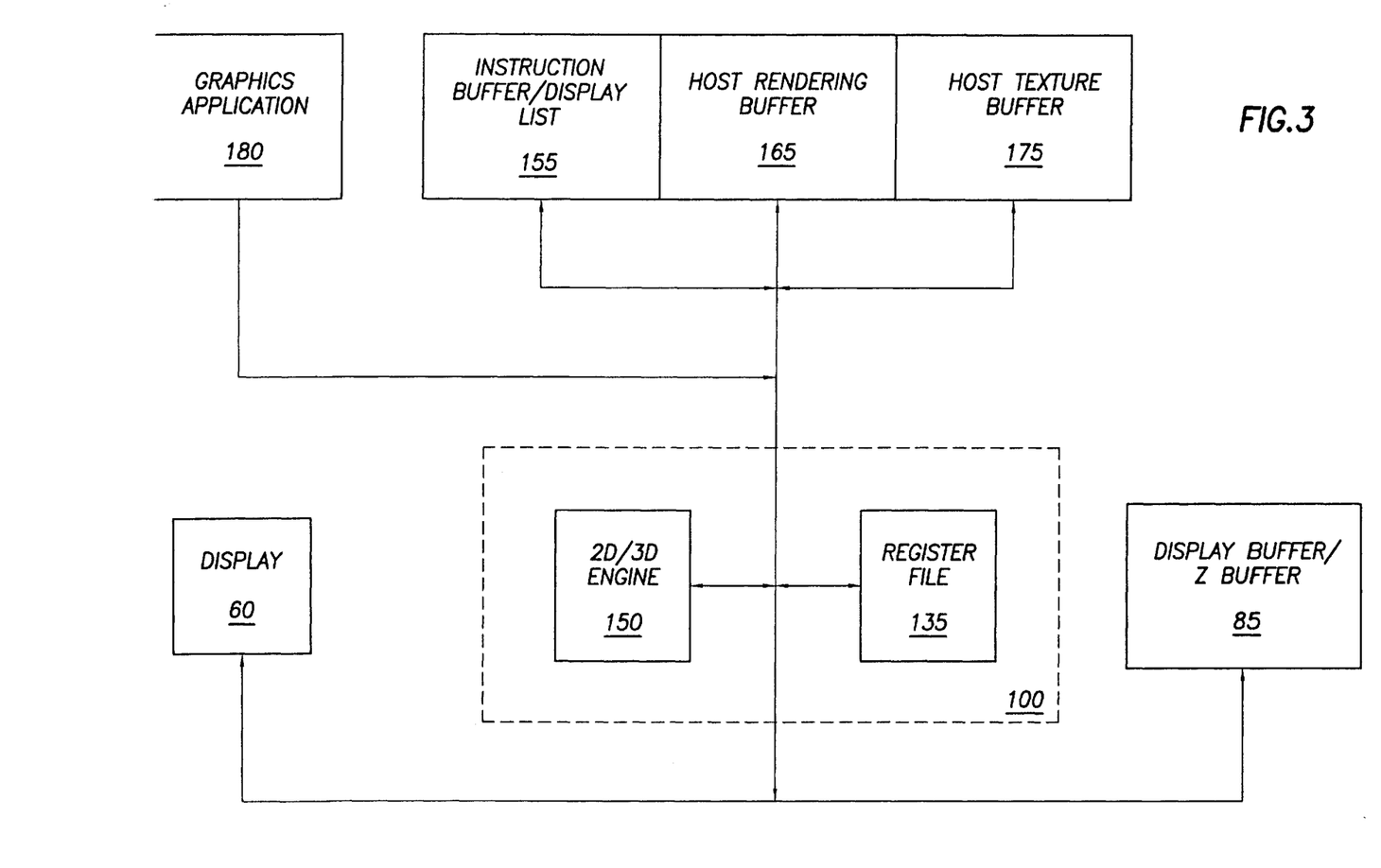
FIG. 3 is a simplified block diagram showing in detail portions of the graphics processor of FIG. 2.

Referring now to FIG. 3, the graphics processor 100 preferably includes a register file 135 and a 2D/3D engine 150 for generating three and two dimensional primitives. The system shown in FIG. 3 includes an instruction buffer 155, a host rendering buffer 165 and a host texture buffer 175. Buffers 155, 165 and 175 store the instructions and parameters generated by the graphics application 180. As one skilled in the art will understand, buffers 155, 165 and 175 may reside in the processor 50 or system memory 75 of FIG. 2.

Still referring to FIG. 3, the graphics processor 100 preferably includes the register file 135 and the 2D/3D engine 150. Other logic may also be provided as part of the graphics but are not included with FIG. 3 so as not to obfuscate the present invention.

The register file 135 receives the instructions and display information from buffer 155 for subsequent use by the 2D/3D engine 150. The 2D/3D engine 150 receives the instructions and display parameters from the register file 135 and generates values for each pixel for rendering on display unit 60. The 2D/3D engine 150 stores the pixel data internally in a storage device in the graphics processor 100 before rendering the pixels to display unit 60 or to the RDRAM 85 (FIG. 2).

Figure 4:
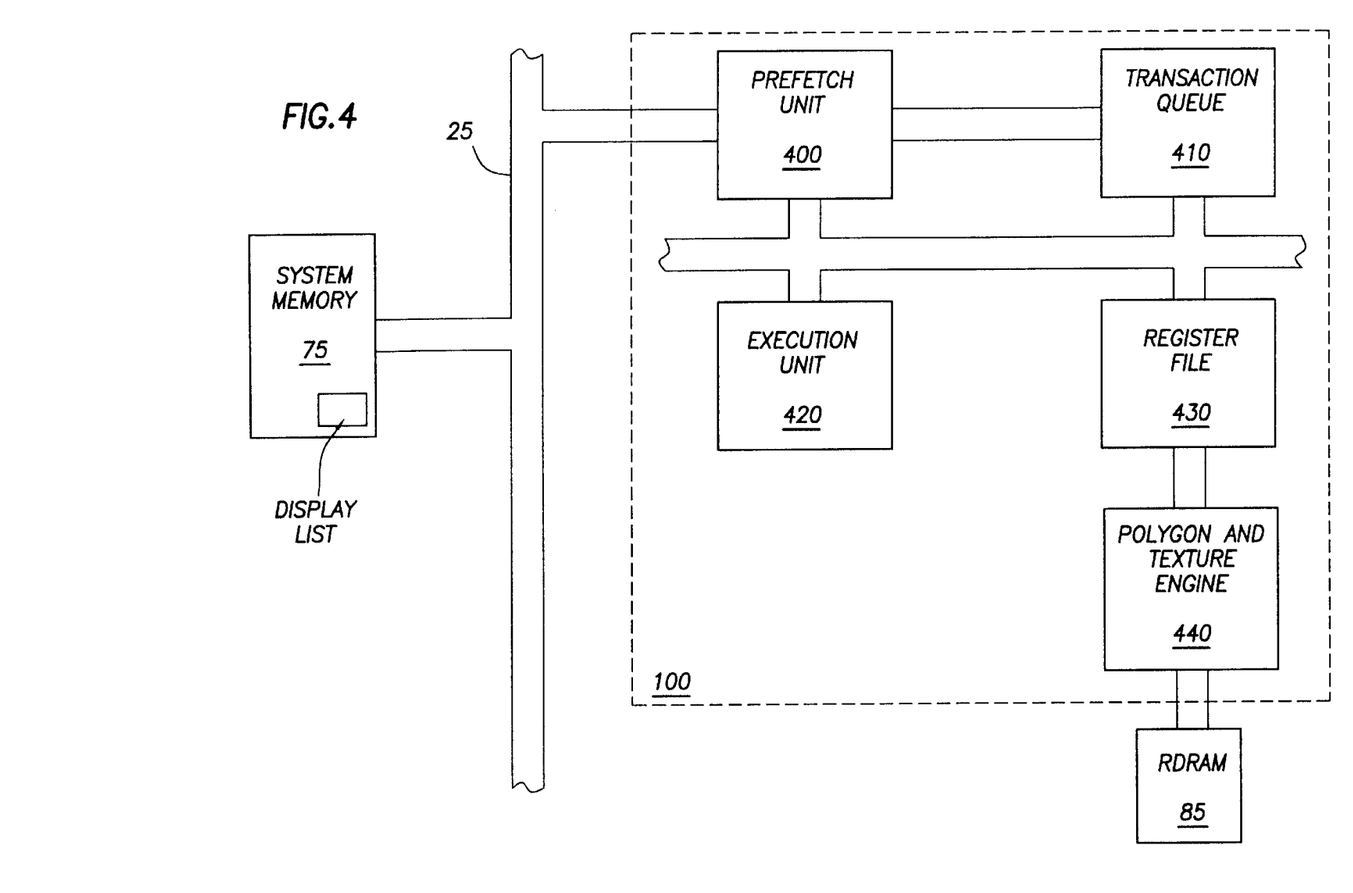
FIG. 4 is a simplified block diagram showing in more detail portions of the 2D/3D engine of FIG. 3.

Referring now to FIG. 4 the graphics processor 100 preferably includes a prefetch unit 400 coupled to an execution unit 420, a transaction queue unit 410, a register file 430 and polygon and texture engines 440.

The prefetch unit 420 provides interface to the system bus 25. Generally, the prefetch unit 400 fetches instructions and the display list and loads the information into the transaction queue unit 410 while the polygon and texture engines 440 are drawing previously fetched instructions.

When the graphics processor 100 is in a bus master mode, the prefetch unit 400 generates the system bus addresses for reading the display list from system memory 75 and then preferably fills the transaction queue 410 with the display list instructions and display list data. The prefetch unit 400 also includes logic for enabling the graphics processor 100 to arbitrate for control of the system bus 25.

The execution unit 420 under the direction of the prefetch unit 400 transfers the contents of the transaction queue 410 to the register file 430 for rendering by the polygon and texture engines 440.

The execution unit 420 generally functions to set the control states for the graphics processor 100, and further synchronize operations of the graphics processor subcomponents. In the preferred embodiment as long as the RDRAM 85 is available, the execution unit 420 is assigned the highest priority by the arbitration logic in the transaction queue 410. Thus, the execution unit 420 is not interrupted while executing an instruction. The execution unit 420 is typically placed in an IDLE mode between each and every render instruction. In addition, the execution unit 420 suspends operation when a current executing instruction requires data from the system bus 25 or system memory 75. The execution unit 420 also includes a poly data tracking logic circuit to handle display list instructions provided by the prefetch unit 400.

Still referring to FIG. 4, the register file 430 generally comprises registers for every possible value to render any primitive. Thus, to load a display list value into the appropriate registers in the register file 430, each value in the display list has an associated address corresponding to a register in the register file 430.

Once a set of display list values from the transaction queue 410 is loaded into the register file 430, the graphics polygon defined by those values is rendered by the polygon and texture engine 440. While the polygon and texture engine 440 are rendering the current polygon from the register file 430, the prefetch unit 400 may receive a display list corresponding to the next primitive to be rendered and, if so, loads the display list into the transaction queue 410. The transaction queue 410 includes a poly queue unit for queuing poly data prefetched by the prefetch unit 400 while the polygon engine 440 is busy rendering previously fetched poly data.

Figure 5:
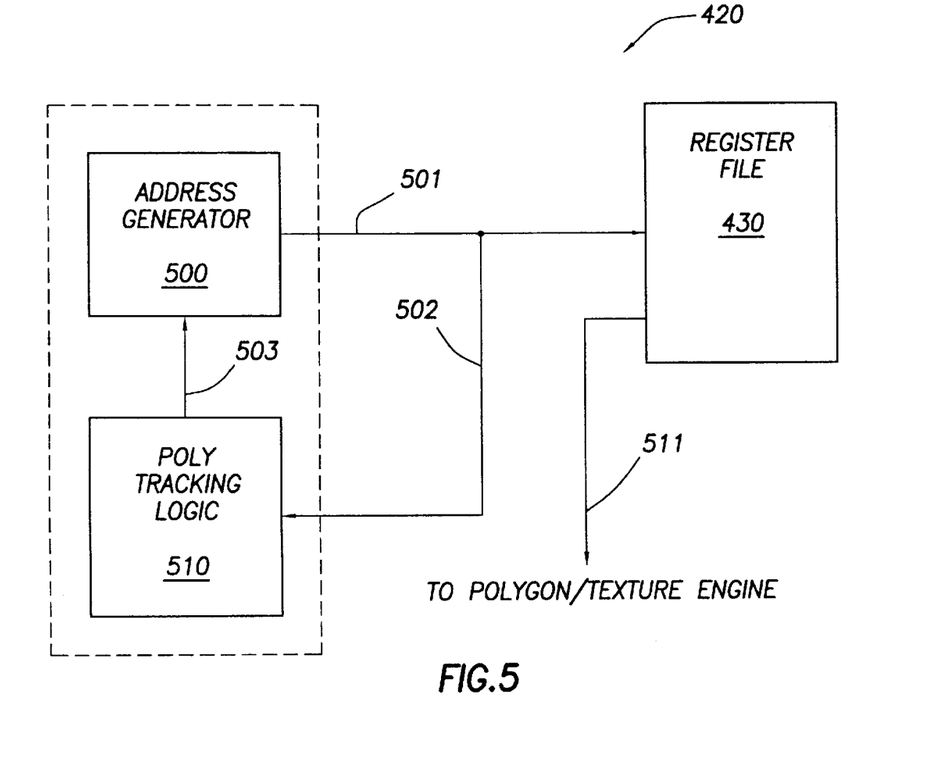
FIG. 5 is a simplified block diagram showing the prefetch unit of FIG. 4 including the poly tracking logic in accordance with the principles of the present invention.

Referring now to FIG. 5 is a simplified block diagram of the execution unit 420. As shown in FIG. 5, the execution unit 420 comprises a register address generation unit 500 and the poly tracking logic 510 of the present invention. As one of ordinary skill in the art would know, the execution unit 420 may include other elements which are not shown in FIG. 5.

The register address generation unit 500 generates an address pertaining to a register file in response to a display list data parameter and transmits the address over signal lines 501 to the register file 430. The data in the register at the provided address is then transmitted to the polygon and texture engines 440 over signal lines 511 to be rendered.

Poly tracking logic 510 receives an operational code (opcode) instruction which includes the opcode itself and the primitive parameter data corresponding to a polygon being rendered. From the opcode instruction, the poly tracking logic 510 determines which registers in register file 430 to write to with the incoming polygon parameter data for a previously rendered primitive.

The poly tracking logic 510 writes the primitive parameter data sequentially to the register file 430 without skipping a register, as is the case in the prior art, regardless of whether the display list for the polygon parameter data contains data pertaining to a register location in the register file 430.

The poly tracking logic 510 receives an operational code instruction (opcode) which includes the opcode itself with the associating polygon parameter data value. From the opcode instructions, the poly tracking logic 510 determines which registers in the register file 430 to write with incoming primitive parameter data for a primitive being rendered.

The poly tracking logic 510 further monitors the poly engine and the transaction queue 410 to determine the number of instructions passed in the transaction queue 410 as each poly is processed in the poly engine 440. By monitoring the transaction queue 410, the poly tracking logic 510 ensures that the transaction queue 410 is not clogged with incoming poly data while the poly engine 440 waits for poly data due to the difference in clock domains between the system memory 75 and the graphics processor 100. The difference in clock domains typically means that data fetched from the system memory 75 may not reach the graphics processor 100 in time to be processed. However, the poly tracking logic of the preferred embodiment ensures that poly data from the system memory 75 is synchronized to the graphics processor's clock domain so that data provided to the graphics processor is not lost.

Figure 6:
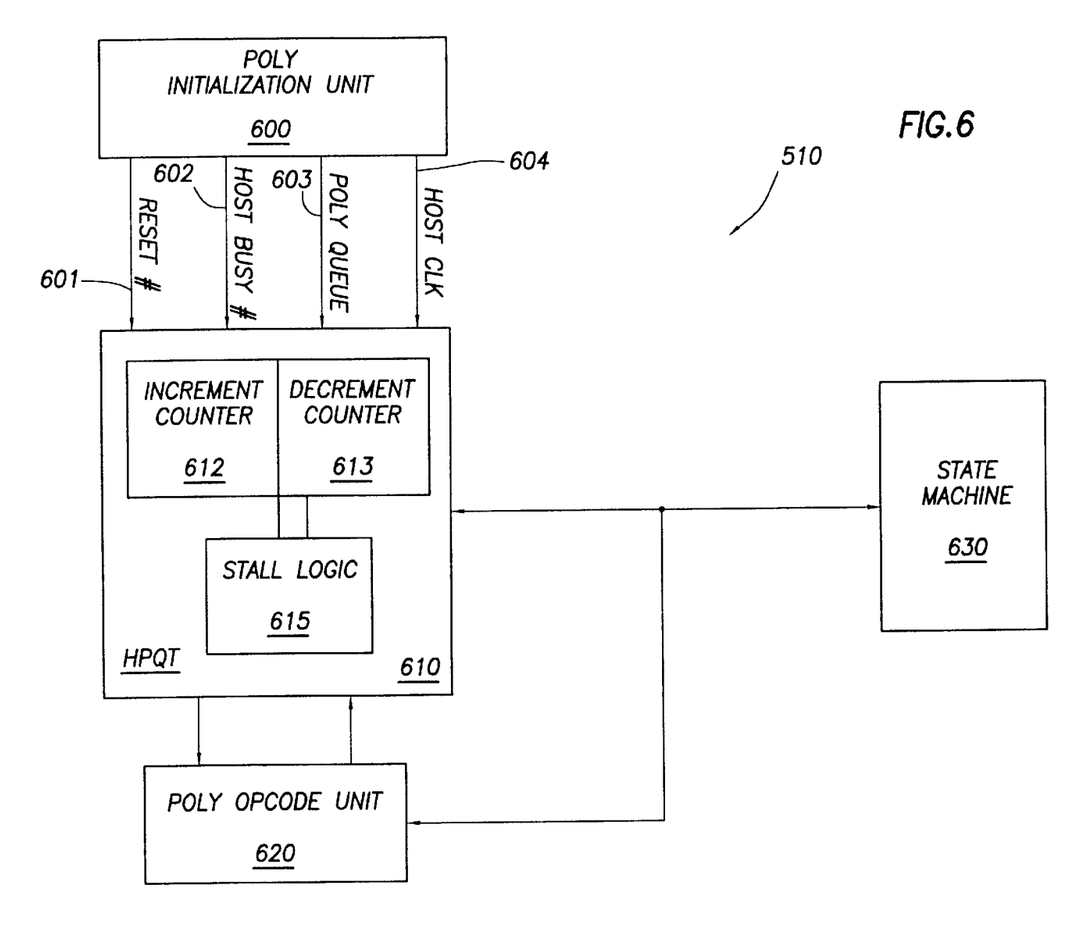
FIG. 6 is an exemplary depiction of the poly tracking logic of FIG. 5 including a host prefetch logic unit in accordance with the principles of the present invention.

Referring now to FIG. 6, an exemplary embodiment of the poly tracking logic 510 of the preferred embodiment is shown. As shown in FIG. 6, the poly tracking logic 510 comprises a poly initialization unit (PIU) 600, a host prefetch queue unit (HPQT) 610, a poly opcode unit (POU) 620 and a poly tracking state machine (SM) 630. The poly tracking logic 510 tracks the number polys (e.g., points, lines etc.) that have been passed on by the prefetch unit 400 to the execution unit 420.

Still referring to FIG. 6, the initialization engine 600 is disposed in the poly tracking logic 510 and coupled to the HPQT 610 to pass the initial values of the poly parameter data values representing the poly to be rendered The HPQT 610 receives as inputs the opcode and opcode instructions for the poly being rendered in the poly engine 440. The HPQT 610 logically tracks the transaction queue 410 to ensure that poly parameter data fetched from system memory 75 is not clogging the poly queue in the transaction queue 410.

Figure 7:
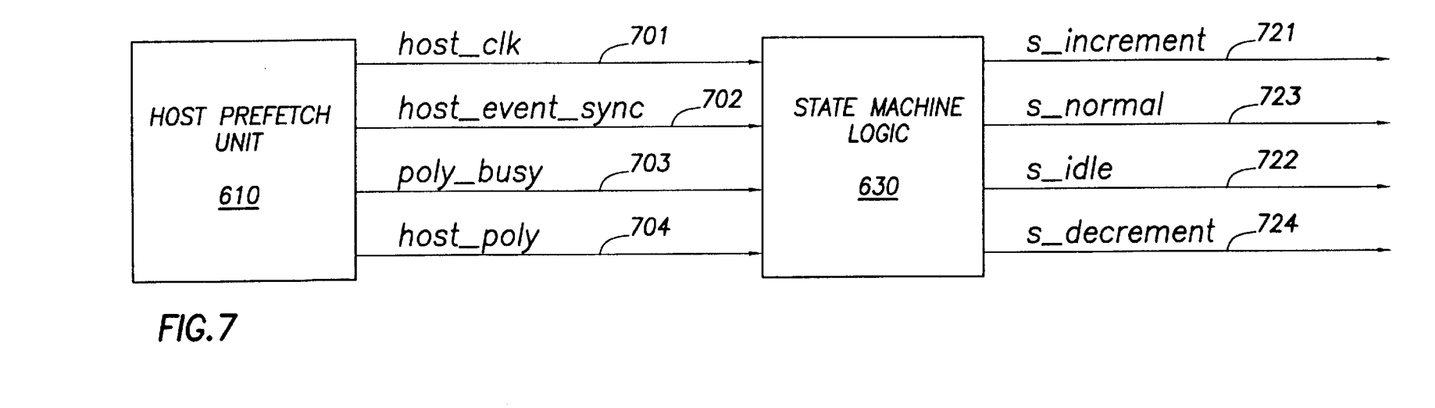
FIG. 7 is an exemplary depiction of the host prefetch unit of FIG. 6 under the control of the state machine of FIG. 6 in accordance with the principles of the present invention.

The HPQT 610 includes an incremental counter register 612 which increments count of poly data values received in the prefetch unit 400 and passed on to the transaction queue 410. In the preferred embodiment, the poly incremental queue counter 612 is five (5) bits wide. The poly incremental queue counter 612 is incremented on every rising edge of a poly busy signal 703 (FIG. 7). The increment logic of the HPQT 610 increments or decrements the contents of the poly queue exclusively if host_event_synchronize signal 702 (FIG. 7) is asserted to guarantee that a busy signal in the graphics processor 100 is only low for one clock. If a double sample occurs in the poly queue, the poly opcode will then be valid only on the transitions from a prefetch state to an instruction decode stage to get the host clock parameters from the prefetch unit 400.

The HPQT 610 further includes a poly queue decrement counter 613 which is coupled to the poly queue increment counter 612. The poly queue decrement counter 613 is decremented on each falling edge of the poly busy signal 703 (FIG. 7) to indicate that a poly data prefetched by the prefetch unit 400 has been processed by the poly engine 440.

Also coupled to the HPQT 610 is the opcode unit 620. The opcode unit 620 stores the poly opcode which includes data bits defining the poly instruction to be processed by the poly engine 440. The poly tracker logic 510 further includes state machine 630 which is coupled to the host prefetch unit 610.

The state machine 630 controls and monitors the BPQT 610 to increment and decrement the counters in the HPQT 610 as poly data is prefetched from system memory 75 and processed in the execution unit 420. In the preferred embodiment, the state machine 630 ensures that poly data fetched from system memory 75 is synchronized to the graphics processor 100 internal clock. Thus, guaranteeing the correct status of the state of operation with the host's clock domain (e.g., PCI clock domain). The state machine 630 is described in detail with reference to FIG. 8 below.

Referring still to FIG. 6, the host prefetch queue unit 610 includes logic 615 to stall the prefetch of poly data from the host system memory 75 if the transaction queue 410 is clogged with already fetched poly data. The stall logic 613 stalls the prefetch of poly data by asserting disable poll stall tracking signals to disable prefetching in the prefetch unit 400. To begin tracking, the stall logic 615 deasserts the disable poly stall tracking signal to enable the increment counters 612.

Referring now to FIG. 7, host prefetch unit 610 under control of state machine logic 630 is shown for generating the various states of operation of the poly tracking logic during a poly data increment state, a poly data decrement state, an idle state and a normal state of operation.

The host clock (host_clk) 701, host_event_Sync signal 702, poly_busy signal 703, and host_poly control signal 704 from the host prefetch unit 610 are provided to the state machine logic 630 and are used to determine and control the four states of the state machine logic 630. The host_clk signal 701 is used to control the processing of poly data internally in the graphics processor 100. The s_first_increment signal 721 is asserted by the state machine logic 630 to control poly data increments in the poly queue. If first_increment signal 721 is de-asserted, the s_idle signal 722 is asserted to interrupt poly data fetches to the prefetch unit 400 (FIG. 4).

The s_normal signal 723 is asserted and used to control a normal state of operation in the graphics processor 100 when poly data flow and processing is in a normal state (e.g., transaction queue is not clogged with poly data). When poly data is prefetched and processed to rendered a graphics primitive, the s_decrement signal 724 is asserted to decrement the poly queue.

Figure 8:
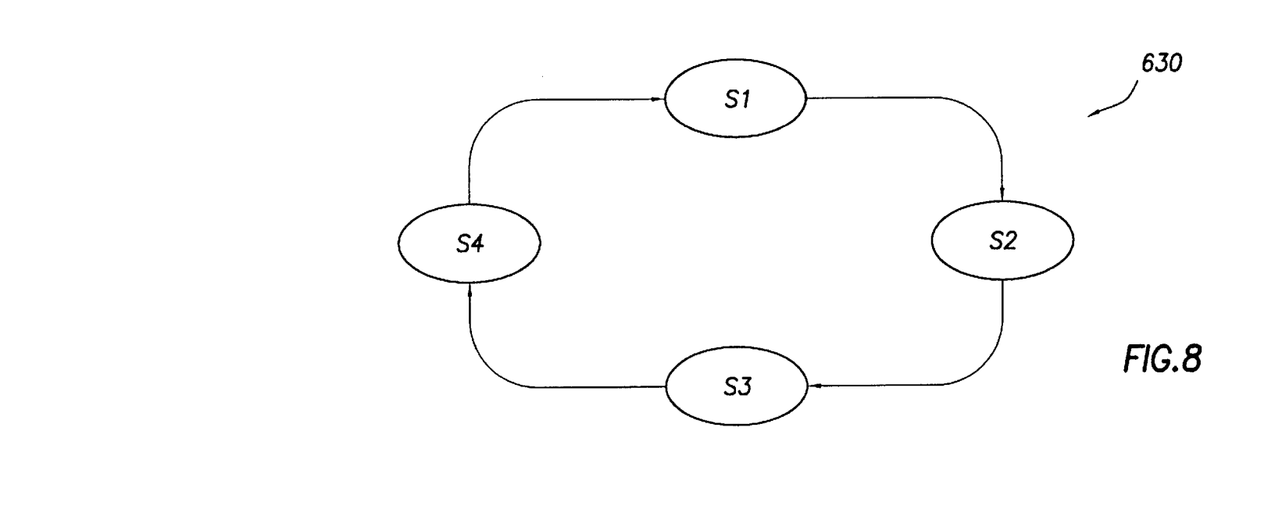
FIG. 8 is a exemplary embodiment of the state machine of FIG. 7 in accordance with the teaching of the present invention.

Referring now to FIG. 8, an exemplary embodiment of the state machine of FIG. 6 is shown. As shown in FIG. 8, the state machine comprises four states (e.g., S1, S2,S3 and S4) for controlling poly address increments and decrements to the poly rendering in the poly engine. As discussed above, the state machine tracks the increment and decrement counters in the host prefetch unit to monitor and control the counting prefetched poly data as the data is fetched from the external memory source and used in the graphics processor.

Still referring to FIG. 8, at state S1, the initialization unit 600 initializes all the parameters necessary for the poly tracking logic 510 to begin tracking poly data flow in the graphics processor. These parameters include the tracking unit, the opcode unit, the host clock and the poly_queue signal, as well as the disable poly stall tracking.

In state S2, the state machine 630 increments the contents of the increment counter as a result of the arrival of new data in the poly opcode unit. The state machine 630 remains in this first increment state until the poly_busy signal 703 is asserted high indicating that the first poly queued in the transaction queue 410 has made it into the poly rendering engine 440.

In state S3, the state machine 630 returns to a normal state if the host poly_busy signal 703 is asserted by the host prefetch unit to indicate that the prefetch unit 400 is in a primitive data fetch mode.

In state S4, the state machine 630 logic decrements the contents of the transaction queue 410 when the poly busy signal goes low signaling that previously fetched data have not made it through the poly engine 440. In this state, the decrement counter is incremented by a count of one at the falling edge of the poly busy signal 703.

Numerous variations and modifications will become apparent to those skilled in the art once the above disclosure is fully appreciated. It is intended that the following claims be interpreted to embrace all such variations and modifications.

What is claimed:

1. A method for tracking polygon data fetched from an external memory source to a destination graphics processor to synchronize the processing of the prefetched polygon data in the graphics processor's clock domain, the method comprising:
   (a) prefetching the polygon data from the external memory source in a first clock domain;
   (b) queuing the prefetched polygon data in a transaction queue in the graphics processor; and
   (c) executing the prefetched polygon data in the graphics processor's internal clock domain, the graphics processor's internal clock domain being different from the first clock domain, comprising:
      tracking the flow of the prefetched polygon data through the graphics processor, including:
         incrementing a polygon data increment register in the graphics processor to indicate the arrival of the prefetched polygon data in the graphics processor; and
         decrementing a polygon data decrement register in the graphics processor to indicate the processing of the prefetched polygon data in the graphics processor;
      stalling prefetching of the polygon data in the graphics processor; and
      synchronizing the state of the prefetched polygon data to the graphics processor's internal clock domain, including ensuring that the polygon data is prefetched at the rising edge of the graphics processor's internal clock.

2. A graphics system for synchronizing graphics data fetched from an external memory source with a first clock domain to a destination graphics system with a second clock domain, the second clock domain having a different clock period than the first clock domain, said graphics system comprising:
   a data prefetch unit that retrieves the graphics data from said external memory source;
   a transaction queue coupled to said data prefetch unit and that receives the prefetched graphics data from said data prefetch unit;

an execution unit coupled to said data prefetch unit and said transaction queue, wherein said execution unit processes graphics data dequeued from said transaction queue;

a counter that increments when said transaction queue receives prefetched data; and a tracking logic unit capable of detecting a stall condition in the prefetched data, wherein if a stall condition is detected, said tracking logic withholds prefetched graphics data from said transaction queue until said execution unit has dequeued and processed all graphics data in said transaction queue.

3. The graphics system of claim 2, wherein the graphics data includes polygon instructions.

4. The graphics system of claim 2, wherein the prefetched graphics data includes an opcode defining the type of graphics operation to be performed on the prefetched graphics data.

5. The graphics system of claim 4 further including a register file that receives the graphics data from said transaction queue, wherein said execution unit includes an address generator that generates register file addresses.

6. The graphics system of claim 5, wherein said execution unit comprises a polygon tracking unit coupled to said address generator and that tracks the processing of the graphics data fetched from said external memory source.

7. The graphics system of claim 2, wherein said counter decrements when said execution processes data released from said transaction queue.

8. The graphics system of claim 7, wherein said tracking logic includes a stall logic unit that monitors said prefetch unit for stall conditions.

9. The graphics system of claim 8, wherein if a stall condition is detected, said tracking logic withholds prefetched graphics data from said transaction queue until the value of said counter is zero.

10. The graphics system of claim 9, further including a state machine coupled to said data prefetch unit and to said counter, wherein said state machine detects stall conditions in prefetched instructions and asserts an increment signal to increment said counter.

11. The graphics system of claim 10, wherein said state machine asserts a decrement signal to decrement said counter.

12. A graphics system configured to receive graphics data from an external memory, comprising:

a prefetching means for retrieving graphics data from said external memory;

a queueing means for receiving the graphics data from said data prefetching means;

an execution means coupled to said queueing means and said prefetching means for processing graphics data dequeued from said queueing means;

a counting means for tracking prefetched data, wherein said counting means increments when said queueing means receives prefetched data; and a tracking means for detecting a stall condition in the prefetched data, wherein if a stall condition is detected, said tracking means withholds prefetched graphics data from said queueing means until said execution means has dequeued and processed all graphics data in said queueing means.

13. The graphics system of claim 12, wherein the graphics data includes polygon instructions.

14. The graphics system of claim 12, wherein the graphics data includes an opcode defining the type of graphics operation to be performed on the prefetched graphics data.

15. The graphics system of claim 14 further including a storage means that receives the graphics data from said queueing means, wherein said execution means includes an address generating means for addressing said storage means.

16. The graphics system of claim 15, wherein said execution means comprises a tracking means coupled to said address generating means for tracking the processing of the graphics data prefetched from said external memory.

17. The graphics system of claim 12, wherein said counting means decrements when said execution means processes prefetched data.

18. The graphics system of claim 17 wherein said tracking means includes a stall logic unit that monitors said prefetching means for stall conditions.

19. The graphics system of claim 18 wherein if a stall condition is detected, said tracking means withholds prefetched graphics data from said queueing means until the value of said counting means is zero.

20. The graphics system of claim 19, further including a state machine coupled to said prefetching means and to said counting means for detecting stall conditions in prefetched instructions and providing an increment signal to increment said counting means.

21. The graphics system of claim 20, wherein said state machine provides a decrement signal to decrement said counting means.

22. A method of synchronizing operations between a graphics processor and a host system, comprising:

(a) prefetching a graphics instruction from said host system;

(b) checking the prefetched instruction for a stall condition;

(c) if a stall condition is detected, executing all pending graphics instructions prior to executing the prefetched instruction;

(d) if no stall condition is detected, storing the prefetched instruction into a transaction queue prior to execution; and (e) incrementing a counter when a prefetched instruction is queued.

23. The method of claim 22, wherein said prefetched graphics instruction comprises a polygon instruction.

24. The method of claim 23, wherein said prefetched graphics instruction includes an opcode defining the type of graphics operation to be performed on the prefetched graphics data.

25. The method of claim 24, wherein the pending graphics instructions include instructions currently being executed.

26. The method of claim 25, wherein the pending graphics instructions include instructions currently stored in said transaction queue.

27. The method of claim 26, including tracking the flow of graphics instructions through the graphics processor.

28. The method of claim 27, wherein tracking the flow of graphics instructions comprises decrementing a counter in response to completing instruction execution.

29. The method of claim 28, including queueing a prefetched instruction having a stall condition only if the value of said counter is zero.

30. A method of synchronizing operations between a graphics processor and a host system, wherein said graphics processor and host system are in different clock domains, comprising:

the step of prefetching for obtaining a polygon instruction from said host system;

the step of checking the prefetched instruction for detecting a stall condition;

the step of executing all pending polygon instructions prior to executing the prefetched instruction, if a stall condition is detected;

the step of storing the prefetched instruction into a transaction queue prior to execution for placing the instruction into the clock domain of the graphics processor, if no stall condition is detected; and the step of incrementing a counter when a prefetched instruction is queued for tracking the flow of polygon instructions.

31. The method of claim 30, wherein the pending polygon instructions include instructions currently being executed.

32. The method of claim 31, wherein the pending polygon instructions include instructions currently stored in said transaction queue.

33. The method of claim 32, including the step of tracking the flow of polygon instructions through the graphics processor for managing stall conditions.

34. The method of claim 33, including the step of decrementing said counter in response to completing instruction execution for tracking the flow of polygon instructions.

35. The method of claim 34, wherein the step of storing the prefetched instruction into a transaction queue occurs during a stall condition only if the value of said counter is zero.

* * * * *